US006639888B1

(12) United States Patent  (10) Patent No.: US 6,639,888 B1
Hasegawa  (45) Date of Patent: *Oct. 28, 2003

(54) INFORMATION READING AND RECORDING DEVICE FOR OPTICAL DISK

(75) Inventor: Shinya Hasegawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,632

(22) Filed: Oct. 27, 1998

(30) Foreign Application Priority Data

Feb. 3, 1998 (JP) .......................... 10-022058

(51) Int. Cl.$^7$ ................................ G11B 7/00
(52) U.S. Cl. .................. 369/112.16; 369/112.05
(58) Field of Search ................. 369/112, 109, 369/118, 44.12, 103, 13, 110, 44.14, 44.23

(56) References Cited

U.S. PATENT DOCUMENTS

| 5,062,098 A | * | 10/1991 | Hori et al. ............... 369/112 |
| 5,115,423 A | * | 5/1992 | Maeda et al. ............. 369/112 |
| 5,515,353 A | * | 5/1996 | Miyazaki ................. 369/112 |
| 5,570,333 A | * | 10/1996 | Katayama ................ 369/110 |
| 5,717,675 A | * | 2/1998 | Yamamoto ............... 369/110 |
| 5,726,962 A | * | 3/1998 | Okada et al. ............. 369/112 |

FOREIGN PATENT DOCUMENTS

| JP | 57-200959 | 12/1982 |
| JP | 4-57224 | 2/1992 |
| JP | 5 109111 | 4/1993 |
| JP | 09-134541 | 5/1997 |
| JP | 09-293266 | 11/1997 |
| JP | 10-021576 | 1/1998 |
| JP | 63-58322 | 4/1998 |

OTHER PUBLICATIONS

Office Action dated Feb. 5, 2002 in Japanese Patent Application 10–022058 filed Jan. 31, 2002 (in the Japanese language).
Japanese Patnet Office Official Action dated Jun. 25, 2002 for corresponding Japanese Patent Application No. 10–022058.

* cited by examiner

Primary Examiner—David Hudspeth
Assistant Examiner—Kim-Kwok Chu
(74) Attorney, Agent, or Firm—Armstrong, Westerman & Hattori, LLP

(57) ABSTRACT

The present invention relates to an information reading and recording device for reading and recording information of an optical signal. The optical system in this information reading and recording device is simplified by using a diffraction optical system. In an information reading and recording device, in which an optical disk is used, including a light source of a semiconductor laser and an image formation lens for condensing beams of light sent from the semiconductor laser so as to form an image on an optical disk medium, a diffraction optical element, the diffraction efficiency of which depends upon a direction of polarization of light, is arranged between the semiconductor lens and the image formation lens, and diffraction light of the diffraction optical element is introduced into a servo detecting optical system. In the case of recording conducted on the disk medium by a laser beam, a transmission factor of the diffraction optical element is made higher than the diffraction efficiency in the case of reading and a transmission factor of the diffraction optical element is made lower than the diffraction efficiency in the case of recording.

15 Claims, 5 Drawing Sheets

P-POLARIZATION

INFORMATION READING AND RECORDING DEVICE FOR OPTICAL DISK

BACKGROUND OF THE INVENTION

1. Field of the Invention

The present invention relates to an information reading and recording device, for reading and recording information as an optical signal, which comprises a reading or recording head of an optical disk device, or optical magnetic disk device, used as a storage device for a computer.

In accordance with the development of high performance computers, it has become necessary to incorporate a storage device of large capacity into the computer. As the storage device to be incorporated into the computer, attention is given to a hard disk device and an optical disk device. Especially, the latter is advantageous in that the disk medium can be easily attached to and detached from the computer, that is, the disk medium can be easily replaced and further the capacity of the disk medium is large and the device is compact and the weight is small. For the above reasons, the optical disk device has become important.

2. Description of the Related Art

It is necessary to further reduce the price of an optical disk device or optical magnetic disk device. In order to reduce the price, there is a strong demand for reducing the price of an optical head portion. Therefore, it has been conventionally necessary to provide a system in which the number of parts of an optical head can be decreased and the size and weight of the optical head can be reduced and also the labor to adjust the optical head can be reduced. On the other hand, in a disk medium in which both reading and recording of data can be conducted, there is a strong demand for increasing the luminous energy of laser beams, and also there is a strong demand for increasing the quantity of light for servo detection or the transmission of an information signal.

For the above reasons, reduction of the number of parts, reduction of labor for adjustment and reduction of the size and weight, by integrating a large number of optical elements such as a polarization separating element of a polarization beam splitter or Wollaston prism, a beam splitter and a mirror into one package, are strongly required.

FIG. 1 is a view showing a signal detection optical system used for a conventional optical head of an optical magnetic disk. Laser beam emitted from a semiconductor laser 1, which is a light source, is made parallel by a collimator lens 2. After a portion of the parallel beam has been transmitted through a beam formation prism 3, it is directed to an optical magnetic disk, which is a storage medium, by a polarization beam splitter 4 and condensed onto an optical magnetic disk 6 by an objective lens 5.

When written data exists on the optical magnetic disk 6, an angle of polarization of light is rotated by the Kerr effect. That is, when written data exists on the optical magnetic disk 6, laser beams of P-polarization light component used for detection are rotated by an angle of θk by the Kerr effect. Therefore, a small quantity of S-polarization light component is generated. Polarization light components (S-component and P-component) of the rays which have returned from the optical magnetic disk 6 are reflected on the polarization beam splitter 4. A beam of light, which has been reflected by the polarization beam splitter 4, is reflected by the polarization beam splitter 7. Then, the beam of light passes through ½ wave plate 8 and condenser lens 9. After that, the beam of light is separated into an S-polarization light component and a P-polarization light component by the polarization light beam splitter 10.

The S-polarization light component and the P-polarization light component are respectively incident on the light detectors 11, 12. When a difference in the intensity of these two signals is found, it is possible to detect a signal.

On the other hand, polarization light components of the rays which have returned from the optical magnetic disk 6 are reflected on the polarization beam splitter 4. A portion of the beam of light, which has been reflected on the polarization beam splitter 4, is reflected on the polarization beam splitter 7 and transmitted through the condenser lens 13. Then, the beam of light is incident on the beam splitter 14. After that, focus is detected by the push-pull method in which the knife edge 15 and the optical detector 16 are used, and the track is detected by an optical detector 17.

As described above, in a conventional signal detection optical system of the optical head for the optical magnetic disk shown in FIG. 1, it is necessary to provide a large number of optical elements such as a polarization separating element of a polarization beam splitter or Wollaston prism, a beam splitter and a mirror. When these optical elements are incorporated, it is necessary to provide a large amount of labor for adjusting these optical elements.

In order to simplify the above-mentioned optical system, as shown in FIG. 2, a structure is proposed in which a servo detection optical system is integrated with a semiconductor laser using a diffraction grating element such as a hologram. That is, in FIG. 2, the optical system 20 of the optical head includes a semiconductor laser 21, a hologram 23 for conducting tracking and detection of the focus, and an optical detection element 24, which are integrated with each other.

The hologram 23 has a plurality of hologram regions 23a to 23d. Reference numerals 23a, 23b are hologram regions for the focus servo, and reference numerals 23c, 23d are hologram regions for the tracking servo. There are provided optical detection elements 24a to 24d for detecting beams of light which have diffracted in the hologram regions 23a to 23d. Reference numerals 24a, 24b are optical detection elements for detecting a focus error signal (FES), and reference numerals 24c, 24d are optical detection elements for detecting a tracking error signal (TES). When the above structure is employed, the optical system can be made compact and simple.

However, even if the above optical system is used, in order to provide a sufficient margin, it is necessary to increase the quantity of light of the laser beams on the overwriting medium. However, an increase in the quantity of light of the laser beams is restricted by a limitation in the manufacture of semiconductor lasers.

In the above optical head used for an optical magnetic disk, in the beam splitter or hologram, when an efficiency of the returning process is lowered in which servo detection of the focus error and tracking error is conducted, it is possible to enhance an efficiency of the outgoing process which is directed to the optical disk medium. However, the above method has a problem in which a quantity of light for servo detection is lowered. For example, when a transmission factor in the outgoing process is 90% in the beam splitter, a reflection factor in the returning process is lowered to 10%. Therefore, it is necessary to enhance the efficiency in the outgoing process.

SUMMARY OF THE INVENTION

It is an object of the present invention to greatly reduce the number of parts and the labor required for adjustment by incorporating parts, which are integrated with each other, into one body together with the package of a semiconductor laser without using a large number of optical elements such as a polarization beam splitter (polarization beam splitter, Wollaston prism and so forth), a beam splitter and a mirror.

Also, it is an object of the present invention to easily realize overwriting when the quantity of light of a servo is distributed to the outgoing process and the returning process in such a manner that the distribution of a quantity of light is changed in accordance with the reading on recording mode.

The present invention provides an optical signal information reading and recording device comprising: a semiconductor laser used as a light source; an image formation lens for condensing a beam of light sent from the semiconductor laser so as to form an image on an optical disk medium; a diffraction optical element for detecting a signal of the optical disk medium, arranged on an optical path between the semiconductor laser and the image formation lens; and a signal detection optical system for detecting a beam of light diffracted by the diffraction optical element; the optical signal information reading and recording device further comprising a polarization light changeover element arranged between the semiconductor laser and the diffraction optical element, wherein a polarization direction of light is changed so that a transmission factor of the diffraction optical element can be higher than the diffraction efficiency in the case of recording conducted on the disk medium by laser beams and a transmission factor of the diffraction optical element can be lower than the diffraction efficiency in the case of recording conducted on the disk medium by laser beams.

According to a further aspect of the present invention, there is provided an optical signal information reading and recording device comprising: an optical source; a lens arranged between the optical source and an optical recording medium for condensing a light emitted from the optical source on the optical recording medium; a diffraction optical element arranged between the optical source and the optical recording medium; a polarization light changeover element for changing a polarization direction of the light emitted from the optical source, wherein the polarization direction of the light emitted from the optical source is changed between in the case of reading information recorded in the optical recording medium and in the case of recording information to the optical recording medium.

In the present invention, the efficiency (transmission efficiency and diffraction efficiency) is changed in the outgoing process and the returning process. That is, in the case of recording, beams of light are transmitted in the diffraction optical grating by a transmission factor of 90% when overwriting is conducted on a medium. At this time, the diffraction efficiency becomes 10% at maximum, however, the quantity of light on the medium is large. Therefore, a quantity of light which has returned after being reflected is sufficiently large. For this reason, even if the diffraction efficiency is 10%, it is possible to conduct a sufficient detection of the quantity of light.

Next, in the case of reading, it is sufficient that a transmission factor of the diffraction optical element is 10%. The reason is that there is a possibility of recording when a quantity of light on the medium is large. However, it is necessary that the quantity of detected light for reading is large. Since this diffraction efficiency is 90% at maximum, it is possible to detect a sufficiently large quantity of light in the servo detection.

The polarization light changeover element is a liquid crystal element for changing over a polarization direction of light arranged on an optical path between the semiconductor laser and the diffraction optical element, and the voltage on the liquid crystal element is controlled so as to set a polarization direction of light so that a transmission factor of the diffraction optical element can be maximum in the case of recording and also the voltage on the liquid crystal element is controlled so as to set a polarization direction of light so that a diffraction efficiency of the diffraction optical element can be maximum in the case of reading. In this case, the changeover can be conducted by only controlling voltage and without moving the liquid crystal element.

The polarization light changeover element is a ½ wave plate for rotating a direction of polarization of light, which is arranged between the semiconductor laser and the diffraction optical element, the direction of the optical axis of the wave plate is set at a polarization direction of light in which a transmission factor of the diffraction optical element becomes maximum in the case of recording, the polarization direction of light is set so that the transmission factor of the diffraction optical element can be maximum in the case of recording when the wave plate is provided, the polarization direction of light is set so that the transmission factor of the diffraction optical element can be maximum in the case of reading when a wave plate is not provided, and the ½ wave plate is moved so that it can be taken in and out with respect to the optical axis in the recording and reading modes.

The diffraction optical element is formed in such a manner that a diffraction grating is provided in a double refraction optical element.

A diffraction pattern for conducting tracking detection and focus detection is formed on the diffraction optical element, and the diffraction optical element, polarization of light changeover element, semiconductor laser and optical detection element are integrated into one body being packaged.

DETAILED DESCRIPTION OF THE EMBODIMENTS

Referring to the accompanying drawings, embodiments of the present invention will be explained in detail as follows.

Figure 1:
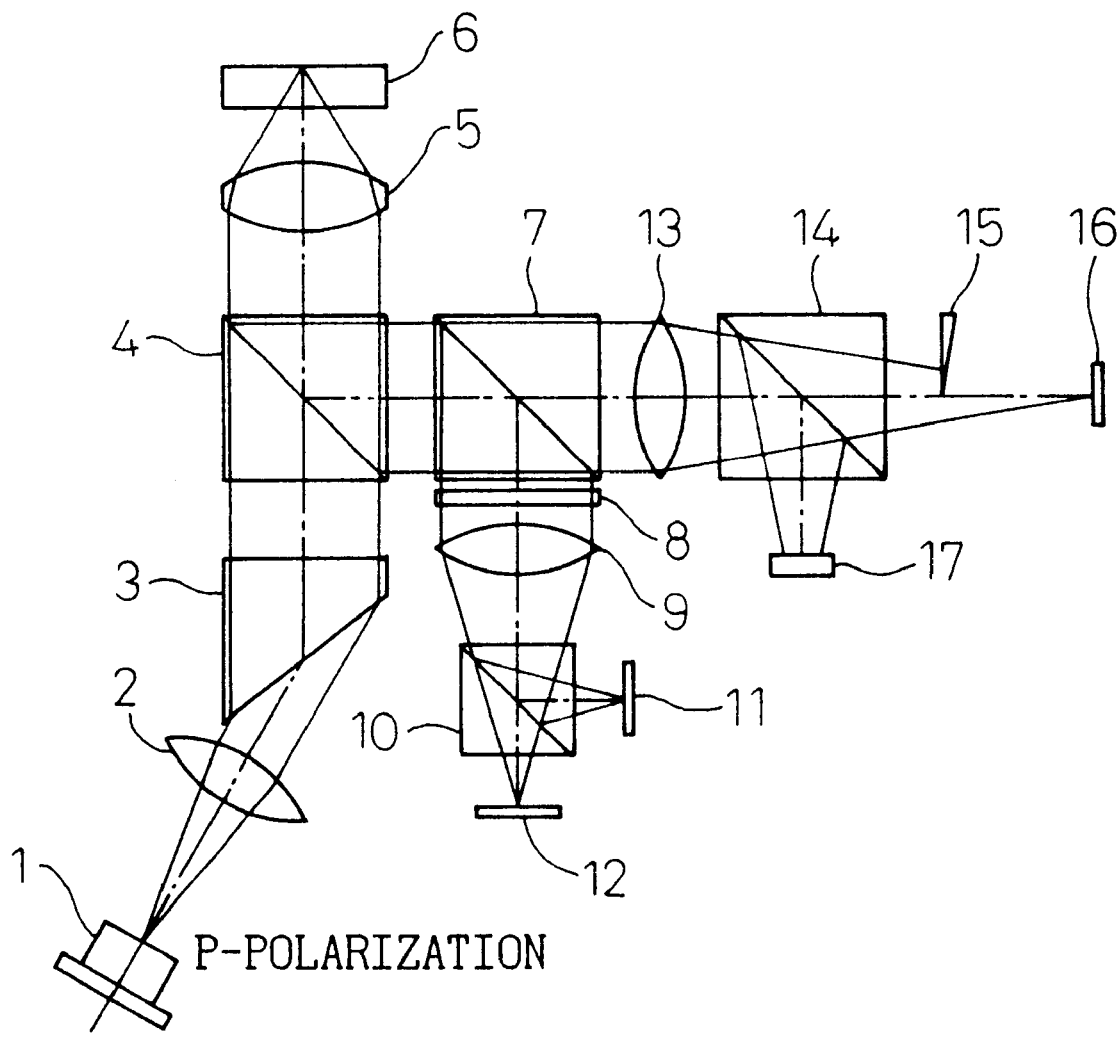
FIG. 1 is a schematic illustration showing an optical head used for a conventional optical magnetic disk known in the prior art.
Figure 2:
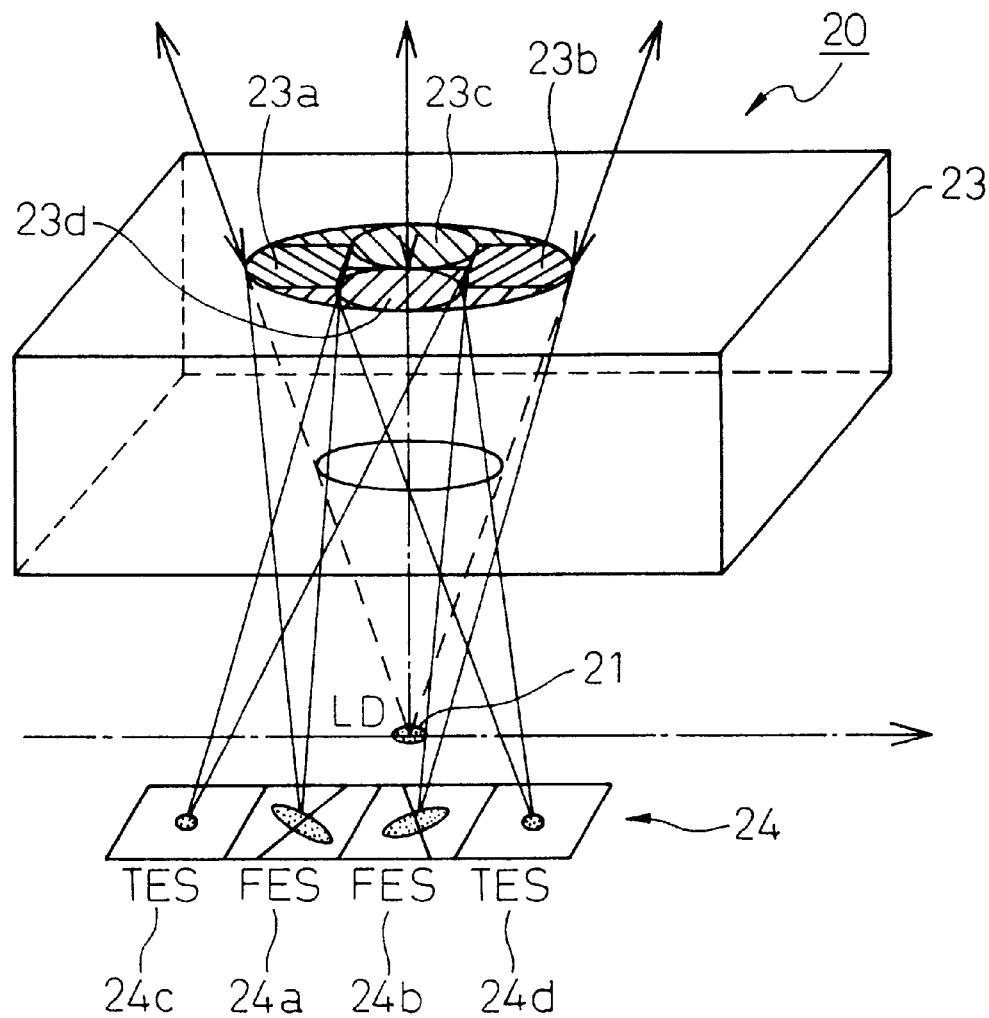
FIG. 2 is a schematic illustration showing an integrated structure of an optical head used for an optical magnetic disk of the conventional example.
Figure 3:
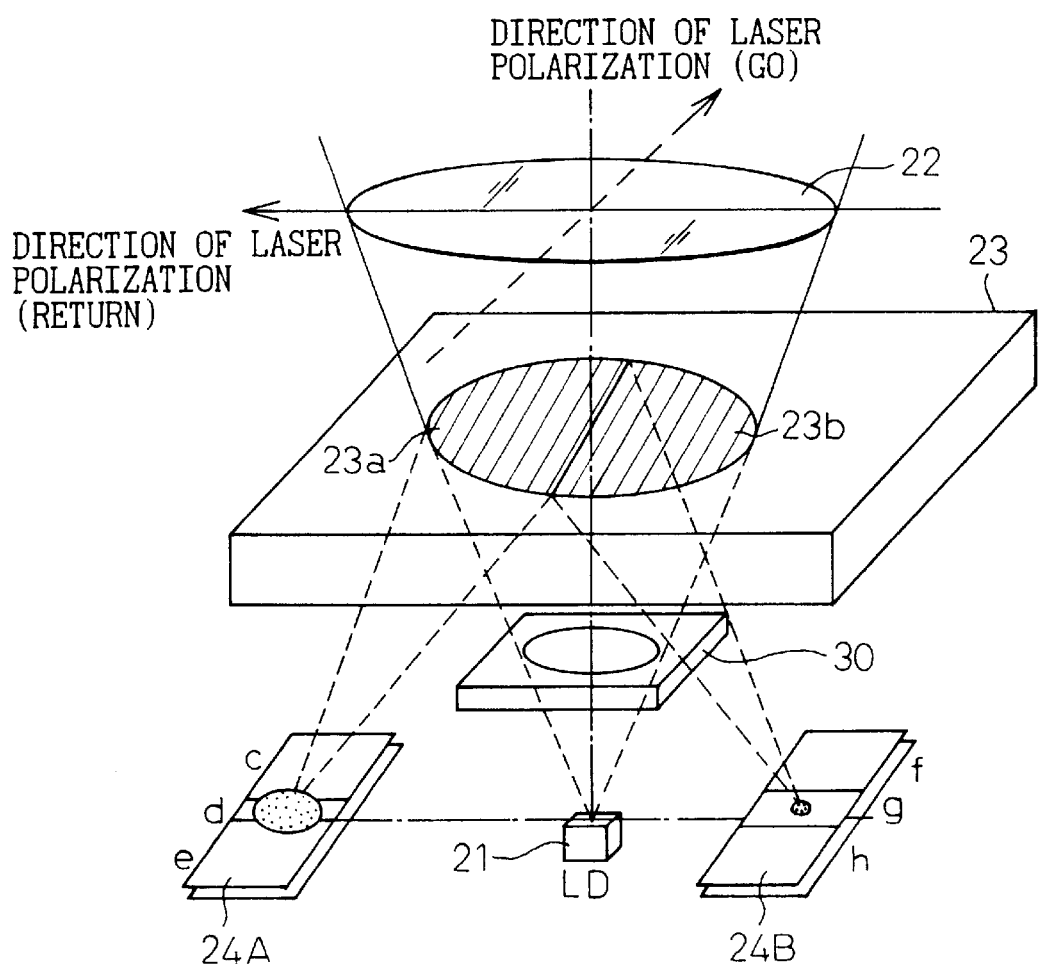
FIG. 3 is a view showing an optical head used for an optical magnetic disk of the first embodiment of the present invention.

FIG. 3 is a view showing an optical head used for an optical magnetic disk of the first embodiment of the present invention. In FIG. 3, in the same structure as that shown in FIG. 2, the optical system 20 of the optical head includes a semiconductor laser 21, a hologram 23 for conducting tracking and detection of the focus and an optical detection element 24, which are integrated with each other into one package.

Concerning the hologram 23, there are provided a plurality of hologram regions 23a, 23b. In the embodiment shown in FIG. 3, reference numerals 23a, 23b function as a hologram region for focus servo and also function as a hologram region for tracking servo. There are provided optical detecting elements 24A, 24B for detecting beams of light diffracted in the hologram regions 23a, 23b. Reference numerals 24A, 24B function as the optical detecting element for detecting a focus error signal (FES) and also function as the optical detecting element for detecting a tracking error signal (TES).

First, in the first embodiment, between the semiconductor light source 21 for laser beams and the hologram 23 which is a diffraction optical element having a dependence upon polarization of light, there is provided a liquid crystal plate 30, for example, composed of a ferroelectric element, which is used as a changeover element of polarization of light. The direction of polarization of light of the hologram 23 is set in a direction in which the diffraction efficiency in the outgoing process of the beam of light becomes minimum in the case of recording. Generally, in the case of a diffraction grating having an effect upon the polarization of light, the diffraction efficiency becomes maximum when the direction of the grating coincides with the direction of polarization of light, and the diffraction efficiency becomes minimum when the direction of the grating is perpendicular to the direction of polarization of light.

Next, in the case of reading, the voltage on a liquid crystal plate is controlled so that polarization of light of the beams is rotated by an angle of 90°. Due to the foregoing, diffracted light in the hologram 23 in the return process becomes maximum and is introduced into the optical detecting elements 24A, 24B. Of course, switching ON on OFF the voltage of the liquid crystal plate 30 may be reverse to the direction of polarization of light. That is, the setting may be conducted as follows. When the voltage of the liquid crystal plate 30 is turned on, the diffraction efficiency of the hologram 23 in the outgoing process becomes minimum in the case of recording, and when the voltage of the liquid crystal plate 30 is turned off, the diffraction efficiency of the hologram 23 in the return process becomes maximum in the case of reading.

A remarkable example of a hologram 23 having a dependence upon polarization of light is a surface relief type hologram. Of course, depending upon an example to which the present invention is applied, an internal refractive index changing type phase hologram can be used.

Concerning the hologram having an effect upon polarization of light, it is possible to form a diffraction grating on a double refraction optical element base plate made of $LiNbO_3$ in the direction of the optical axis.

Figure 4:
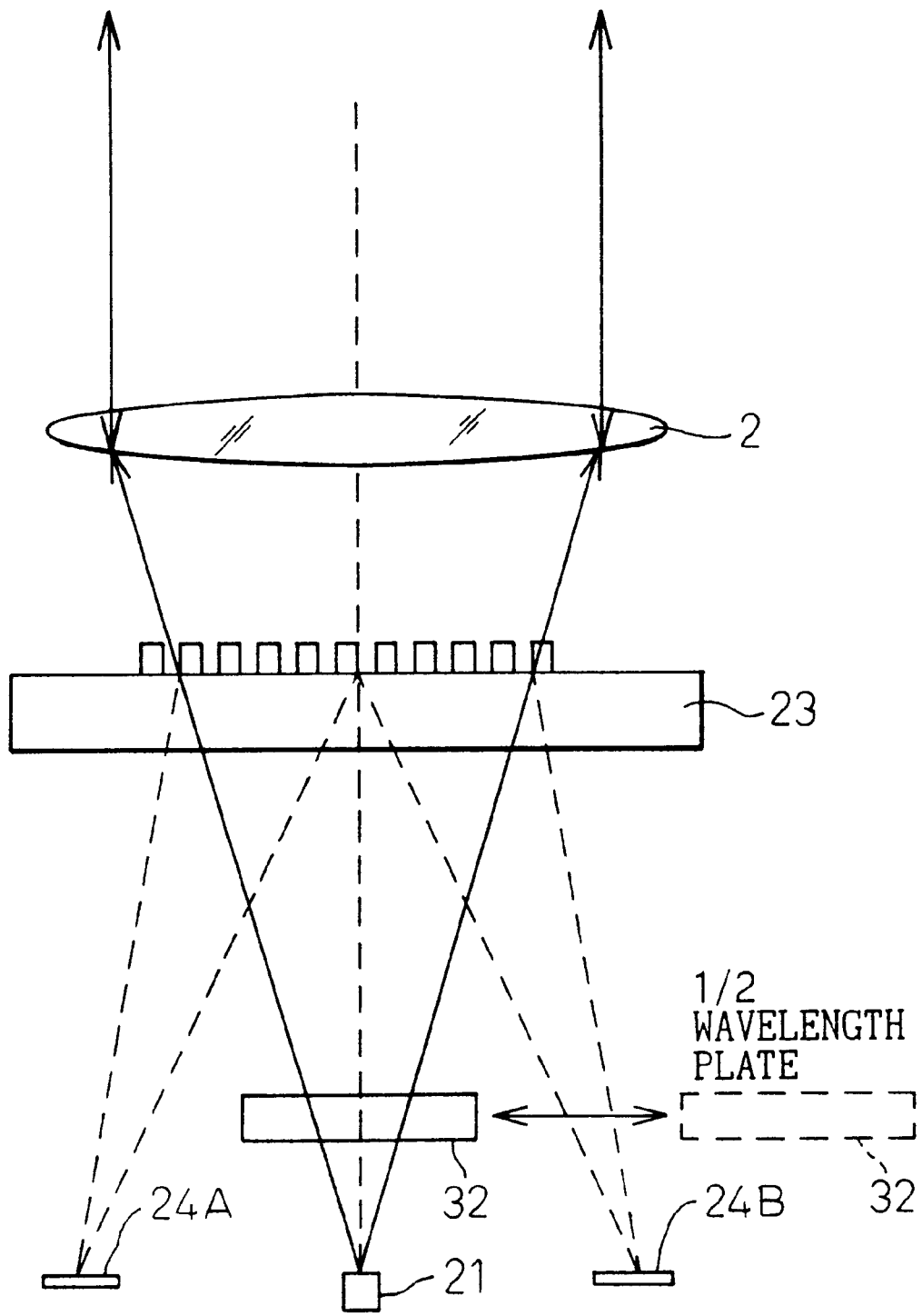
FIG. 4 is a view showing an optical head used for an optical magnetic disk of the second embodiment of the present invention.

FIG. 4 is a view showing an optical head of an optical magnetic disk device of the second embodiment of the present invention. In this embodiment, as a changeover element for polarization of light, a ½ wave plate 32 is arranged between the semiconductor laser light source 21 and the hologram 23 which is a diffraction optical element having an effect upon polarization of light. This ½ wave plate 32 is composed in such a manner that it can be withdrawn and inserted with respect to the optical axis.

For example, in the case of recording, the direction of polarization of light of the hologram 23, which is a diffraction optical element, is set so that the diffraction efficiency in the outgoing process can be minimum, that is, the transmission factor can be maximum. Generally, in the case of a diffraction grating having an effect upon polarization of light, when the direction of the grating coincides with the direction of polarization of light, the diffraction efficiency becomes a maximum, and when the direction of the grating is perpendicular to the direction of polarization of light, the diffraction efficiency becomes a minimum.

Next, in the case of reading, polarization of light is made to revert to the initial state, that is, polarization of light is rotated by an angle of 90° under the condition that ½ wave plate 32 is moved away from the optical axis. In this way, diffraction light is made a maximum and introduced into the optical detecting elements 24A, 24B. Of course, drawing and inserting of ½ wave plate may be reverse to the direction of polarization of light.

Figure 5:
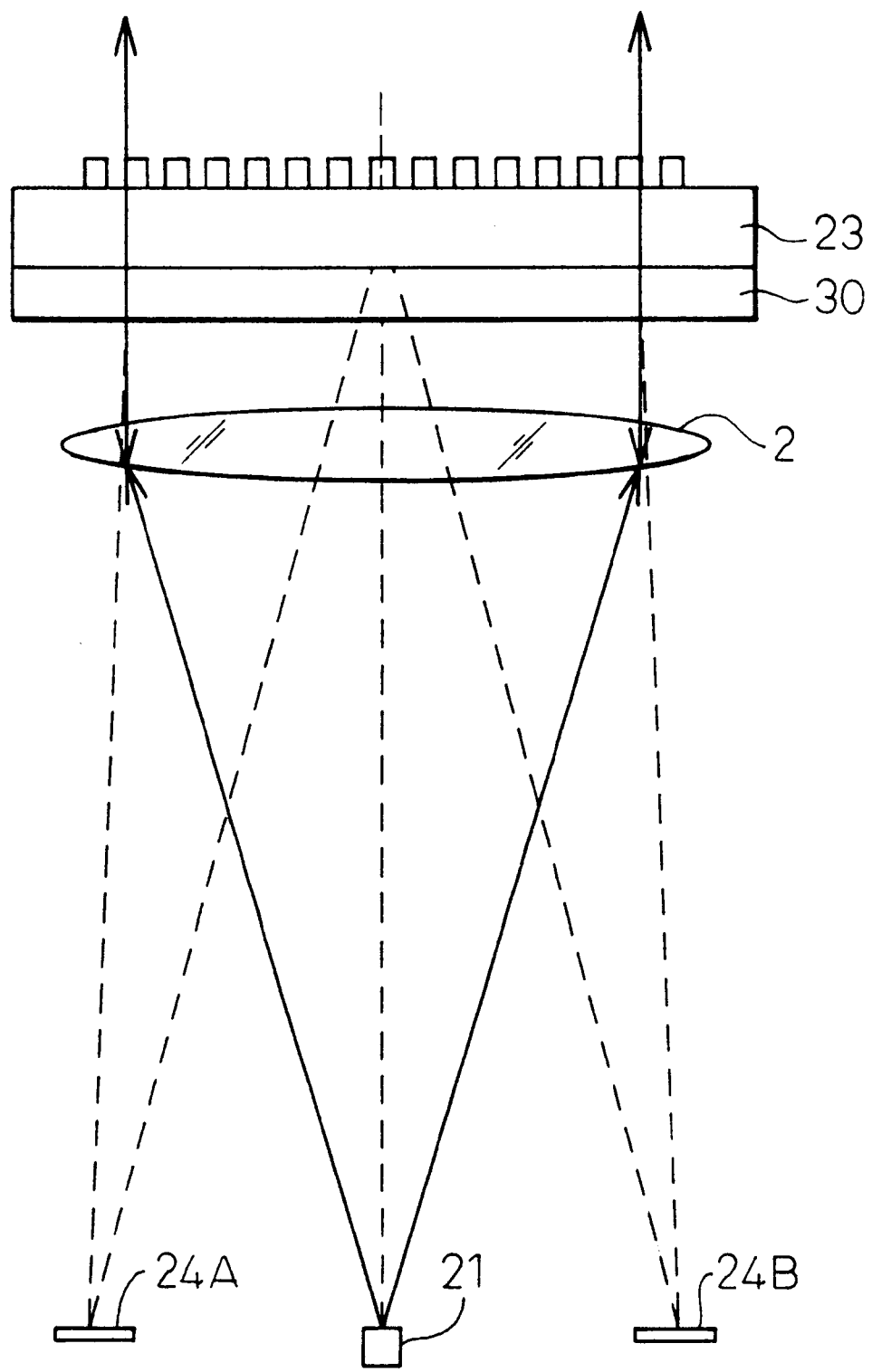
FIG. 5 is a view showing an optical head used for an optical magnetic disk of the third embodiment of the present invention.

FIG. 5 is a view showing an optical head of an optical magnetic disk device of the third embodiment of the present invention. In this embodiment, a changeover element of polarization of light, for example, the liquid crystal plate 30, is integrated with a diffraction optical element having an effect upon polarization of light, that is, the hologram 23. The collimator lens 2, which converts the laser beams sent from the semiconductor laser 21 into parallel beams of light, is arranged between the semiconductor laser 21 and the changeover element 30 of polarization of light integrated with the hologram 23.

In this connection, if a hologram pattern for the servo detection is formed in the diffraction optical element, it is possible to further reduce the size of the apparatus and the number of parts.

Next, the hologram 23 will be explained as follows. As shown in FIG. 3, the hologram 23 includes a hologram region 23a for focus servo and a hologram region 23b for tracking servo. As described above, the hologram 23 is divided into two regions for servo detection, however, the number of regions is not particularly limited to this number.

Beams of light for diffraction sent from the hologram 23 are respectively incident on the detectors 24A, 24B, and servo detection is conducted. Phases Φa and Φb of the hologram regions 23a, 23b are expressed by the following equations.

$$\Phi_H a = \Phi a - \Phi_O$$

$$\Phi_H b = \Phi b - \Phi_O$$

where $\Phi_H a$ and $\Phi_H b$ are respectively phases of the wave surfaces converging on the detectors 24A, 24B in the hologram region.

In the above equation, $\Phi_O$ is a phase of the wave surface of the spherical surface of the semiconductor laser beam which is incident on the hologram 23. Φa is a phase of the converging wave surface, the focus of which is located at an inner position more distant than the detector 24A. Φb is a phase of the converging wave surface, the focus of which is located at a position on the hologram side closer than the detector 24B.

The focus error signal (FES) servo and the track error signal (TES) servo can be respectively detected by the following equations.

$$FES = (c+e+g) - (f+h+d)$$

$$TES = (c+d+e) - (f+g+h)$$

where the quantities of light at the detectors are respectively represented by c, d, e, f, g and h. Of course, the servo detection can be conducted by other methods.

Concerning a method of making the hologram, the hologram can be made by being directly drawn with an electron beam or a laser beam.

Another method of making the hologram is described as follows. A large hologram pattern is directly drawn beforehand. The thus obtained pattern is reduced by a stepper so as to make a mask, and a pattern is transferred by means of photolithography.

Embodiments of the present invention are explained above in detail referring to the accompanying drawings. However, the present invention is not limited to the above specific embodiment. It should be noted that variations and modifications may be made by one skilled in the art without departing from the spirit and scope of the present invention.

As explained above, according to the present invention, it is possible to realize an optical disk device or an optical magnetic disk device, the size of which is small and the price of which is low and further the reliability of which is high.

What is claimed is:

1. An optical information reading and recording device comprising;
   a semiconductor laser used as light source;
   a condensing lens for condensing a beam of light sent from the semiconductor laser so as to irradiate on an optical recording medium;
   a diffraction optical element for diffracting a signal of the optical recording medium, arranged on an optical path between the semiconductor laser and the condensing lens; in the diffraction optical element, the time when diffraction efficiency is maximum and transmission efficiency is minimum and the time when diffraction efficiency is minimum and transmission efficiency is maximum being determined by the direction of polarization of light;
   a signal detection optical system for detecting beams of light diffracted by the diffraction optical element, and
   a polarization light changeover element arranged between the semiconductor laser and the diffraction optical element in an optical axis, wherein a polarization direction of light is changed so that, in order to change servo light intensity between a forth path and a back path, the transmission efficiency of the diffraction optical element is maximum in the case of recording conducted to the recording medium by laser beams to increase the light intensity when recording, and the diffraction efficiency of the diffraction optical element is maximum to increase the optical intensity for servo detecting in the case of reading conducted on the recording medium by laser beams and the transmission efficiency is different from the diffraction efficiency.

2. An optical information reading and recording device according to claim 1, wherein the polarization light changeover element comprises a liquid crystal element for changing over a polarization direction of light arranged on an optical path between the semiconductor laser and the diffraction optical element, and a voltage on liquid crystal element is controlled so as to set a polarization direction of light so that a transmission efficiency of the diffraction optical element can be maximum in the case of recording and also a voltage of the liquid crystal element is controlled so as to set a polarization direction of light so that a diffraction efficiency of the diffraction optical element can be maximum in the case of reading.

3. An optical information reading and recording device according to claim 1, wherein polarization light changeover element is a half wave plate, for rotating a direction of polarization of light, which is arranged between the semiconductor laser and the diffraction optical element, a direction of the optical axis of the wave plate is set at a polarization direction of light in which a transmission efficiency of the diffraction optical element becomes maximum in the case of recording, the polarization direction of light is set so that the transmission efficiency of the diffraction optical element can be maximum in the case of recording when the half wave plate is provided, the direction of polarization of light is set so that the diffraction efficiency of the diffraction optical element can be maximum in the case of reading when the half wave plate is not provided, and the half wave plate is moved so that it can be taken in and out with respect to the optical axis in the cases of recording and reading.

4. An optical information reading and recording device according to claim 1, wherein the diffraction optical element is formed in such a manner that a diffraction grating is provided in a double refraction optical element.

5. An optical information reading and recording device according to claim 1, wherein a diffraction pattern for conducting tracking detection and focus detection is formed on the diffraction optical element, and the diffraction optical element, the polarization light changeover element, the semiconductor laser and the optical detection element are integrated into one body package.

6. An optical information reading an recording device according to claim 1, wherein polarization light changeover element is a half wave plate, for rotating a direction of polarization of light, which is arranged between the semiconductor laser and the diffraction optical element, the half wave plate is moved so that it can be taken in and out with respect to the optical axis in the cases of recording and reading, wherein the polarization direction of light is set so that the transmission efficiency or the diffraction optical element can be maximum in the case of recording, and the polarization direction of light is set so that the diffraction efficiency of the diffraction optical element can be maximum in the case of reading.

7. An optical information reading and recording device comprising;
   an optical source;
   a lens arranged between the optical source and an optical recording medium for condensing a light emitted from the optical source on the optical recording medium;
   a diffraction optical element arranged between the optical source and the optical recording medium, in the diffraction optical element, the time when diffraction efficiency is maximum and transmission efficiency is minimum and the time when diffraction efficiency is minimum and transmission efficiency is maximum being determined by the direction of polarization of light;
   a polarization light changeover element for changing a polarization direction of the light emitted from the optical source, wherein the polarization direction of the light emitted from the optical source is changed between in the case of reading information recorded in the optical recording medium and in the case of recording information to the optical recording medium, wherein said polarization light changeover element is arranged between said optical source and said diffraction optical element in an optical axis.

8. An optical information reading and recording device according to claim 7, wherein the polarization light changeover element is a liquid crystal element for changing over a polarization direction of light arranged on an optical path between the optical source and the diffraction optical element, and a voltage on the liquid crystal element is controlled so as to set a polarization direction of light so that a transmission efficiency of the diffraction optical element can be maximum in the case of recording and also a voltage of the liquid crystal element is controlled so as to set a polarization direction of light so that a diffraction efficiency of the diffraction optical element can be maximum in the case of reading.

9. An optical information reading and recording device according to claim 7, wherein the polarization light changeover element comprises a half wave plate, for rotating a polarization direction of light, which is arranged between the optical source and the diffraction optical element, a direction of the optical axis of the wave plate is set at a polarization direction of light in which a transmission efficiency of the diffraction optical element becomes maximum in the case of recording, the polarization direction of light is set so that the transmission efficiency of the diffraction optical element can be maximum in the case of recording when the half wave plate is provided, the polarization direction of light is set so that the diffraction efficiency of the diffraction optical element can be maximum in the case of reading when the half wave plate is not provided, and the half wave plate is moved so that it can be taken in and out with respect to the optical axis in the cases of recording and reading.

10. An optical information reading and recording device according to claim 7, wherein the diffraction optical element is formed in such a manner that is diffraction grating is provided in a double refraction optical element.

11. An optical information reading and recording device according to claim 7, wherein a diffraction pattern for conducting tracking detection and focus detection is formed on the diffraction optical element, and the diffraction optical element, the polarization of light changeover element, the semiconductor laser and the optical detection element are integrated into one body.

12. An optical information reading and recording device according to claim 7, wherein the polarization light changeover element comprises a half wave plate, for rotating a polarization direction of light, which is arranged between the optical source and the diffraction optical element, the half wave plate is moved so that it can be taken in and out with respect to the optical axis in the cases of recording and reading, wherein the polarization direction of light is set so that the transmission efficiency of the diffraction optical element can be maximum in the case of recording, and the polarization direction of light is set so that the diffraction efficiency of the diffraction optical element can be maximum in the case of reading.

13. An optical head comprising:

an optical source;

a diffraction optical element;

a polarization light changeover element for changing a polarization direction of the light emitted for the optical source, wherein the polarization direction of the light emitted from the optical source is changed between in the case of reading information recorded in an optical recording medium and in the case of recording information to the optical recording medium, wherein said polarization light changeover element is arranged between said optical source and said diffraction optical element in an optical axis; and a signal detector for detecting an optical signal from the optical recording medium, wherein the polarization light changeover element is a liquid crystal element for changing over a polarization direction of light arranged on an optical path between the optical source and the diffraction optical element, and a voltage on the liquid crystal element is controlled so as to set a polarization direction of light so that a transmission efficiency of the diffraction optical element can be maximum in the case of recording and also a voltage of the liquid crystal element is controlled so as to set a polarization direction of light so that a diffraction efficiency of the diffraction optical element can be maximum in the case of reading.

14. An optical head comprising:

an optical source;

a diffraction optical element;

a polarization light changeover element for changing a polarization direction of the light emitted for the optical source, wherein the polarization direction of the light emitted from the optical source is changed between in the case of reading information recorded in an optical recording medium and in the case of recording information to the optical recording medium, wherein said polarization light changeover element is arranged between said optical source and said diffraction optical element in an optical axis; and a signal detector for detecting an optical signal from the optical recording medium, wherein the polarization light changeover element is a half wave plate, for rotating a polarization direction of light, which is arranged between the optical source and the diffraction optical element, a direction of the optical axis of the wave plate is set at a polarization direction of light in which a transmission efficiency of the diffraction optical element becomes maximum in the case of recording, the polarization direction of light is set so that the transmission efficiency of the diffraction optical element can be maximum in the case recording when the half wave plate is not provided, the polarization direction of light is set so that the transmission efficiency of the diffraction optical element can be maximum in the case of reading when the half wave plate is provided, and the half wave plate is moved so that it can be taken in and out with respect to the optical axis in the cases of recording and reading.

15. An optical head comprising:

an optical source;

a diffraction optical element;

a polarization light changeover element for changing a polarization direction of the light emitted for the optical source, wherein the polarization direction of the light emitted from the optical source is changed between in the case of reading information recorded in an optical recording medium and in the case of recording information to the optical recording medium, wherein said polarization light changeover element is arranged between said optical source and said diffraction optical element in an optical axis; and a signal detector for detecting an optical signal from the optical recording medium, wherein the polarization light changeover element is a half wave plate, for rotating a polarization direction of light, which is arranged between the optical source and the diffraction optical element, the half wave plate is moved so that it can be taken in and out with respect to the optical axis in the cases of recording and reading, wherein the polarization direction of light is set so that the transmission efficiency of the diffraction optical element can be maximum in the case recording, and the polarization direction of light is set so that the diffraction efficiency of the diffraction optical element can be maximum in the case of reading.

* * * * *